(12) United States Patent
Guo et al.

(10) Patent No.: US 11,917,320 B2
(45) Date of Patent: Feb. 27, 2024

(54) METHOD, DEVICE AND SYSTEM FOR SENDING VIRTUAL CARD, AND READABLE STORAGE MEDIUM

(71) Applicant: BOE Technology Group Co., Ltd., Beijing (CN)

(72) Inventors: Xiaoqin Guo, Beijing (CN); Baoyu Shi, Beijing (CN); Changfeng Zhang, Beijing (CN); Jingyu Zhang, Beijing (CN); Lirong Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 372 days.

(21) Appl. No.: 17/437,107

(22) PCT Filed: Nov. 23, 2020

(86) PCT No.: PCT/CN2020/130898
§ 371 (c)(1),
(2) Date: Sep. 8, 2021

(87) PCT Pub. No.: WO2022/104800
PCT Pub. Date: May 27, 2022

(65) Prior Publication Data
US 2023/0362320 A1   Nov. 9, 2023

(51) Int. Cl.
*H04N 5/272* (2006.01)
*G10L 17/06* (2013.01)
*G06V 40/16* (2022.01)

(52) U.S. Cl.
CPC ........... *H04N 5/272* (2013.01); *G06V 40/172* (2022.01); *G10L 17/06* (2013.01)

(58) Field of Classification Search
CPC ........ H04N 5/272; H04N 7/15; G06V 40/172; G10L 17/06; G10L 25/78; G06K 9/00248; G06K 9/00711; G06K 9/6202
See application file for complete search history.

(56) References Cited

U.S. PATENT DOCUMENTS

2010/0085415 A1  4/2010 Rahman
2015/0081550 A1* 3/2015 Priebatsch ............. G06Q 20/20
705/44

(Continued)

FOREIGN PATENT DOCUMENTS

CN          101083752 A    12/2007
CN          101540873 A     9/2009
(Continued)

*Primary Examiner* — Phung-Hoang J Nguyen
(74) *Attorney, Agent, or Firm* — ArentFox Schiff LLP; Michael Fainberg

(57) ABSTRACT

Disclosed are a method, device and system for sending a virtual card and a readable storage medium, which are configured to receive at least one audio-video stream data of a plurality of participant terminals in communication connection with a server side; determine target audio-video stream data corresponding to at least one speaker from the at least one audio-video stream data; obtain biological characteristic information for identifying the at least one speaker from the target audio-video stream data, the biological characteristic information includes face characteristic information and/or voiceprint characteristic information; generate a virtual card according to the biological characteristic information; overlay the virtual card to the target audio-video stream data, and synthesize the target audio-video stream data with other audio-video stream data in response to there being a plurality of audio-video stream data into a to-be-sent audio-video stream data; send the to-be-sent audio-video stream data to the participant terminals.

18 Claims, 6 Drawing Sheets

(56) References Cited

U.S. PATENT DOCUMENTS

| | | | |
|---|---|---|---|
| 2015/0334344 A1* | 11/2015 | Shoemake | H04N 7/14 |
| | | | 348/14.16 |
| 2015/0347734 A1* | 12/2015 | Beigi | H04L 9/3268 |
| | | | 726/28 |
| 2022/0051024 A1 | 2/2022 | Yang | |

FOREIGN PATENT DOCUMENTS

| | | | |
|---|---|---|---|
| CN | 102611818 A | 7/2012 |
| CN | 103325107 A | 9/2013 |
| CN | 104767963 A | 7/2015 |
| CN | 102006453 A | 11/2017 |
| CN | 107370981 A | 11/2017 |
| CN | 109831638 A | 5/2019 |
| CN | 110519546 A | 11/2019 |
| CN | 110572607 A | 12/2019 |

* cited by examiner

METHOD, DEVICE AND SYSTEM FOR SENDING VIRTUAL CARD, AND READABLE STORAGE MEDIUM

CROSS-REFERENCE TO RELATED APPLICATIONS

This application is a National Stage of International Application No. PCT/CN2020/130898, filed Nov. 23, 2020, which is hereby incorporated by reference in its entirety.

FIELD

The present disclosure relates to the technical field of information, in particular to a method, device and system for sending a virtual card, and a readable storage medium.

BACKGROUND

With the development of an information technology, the remote video conference gradually replaces the traditional round table conference because of its high communication efficiency.

SUMMARY

Some embodiments of the present disclosure provide a method for sending a virtual card, applied to a server side, and including:
  receiving at least one piece of audio-video stream data of a plurality of participant terminals in communication connection with the server side;
  determining a target audio-video stream data corresponding to at least one speaker from the at least one piece of audio-video stream data;
  obtaining a biological characteristic information configured to identify the at least one speaker from the target audio-video stream data, wherein the biological characteristic information comprises at least one of a face characteristic information or a voiceprint characteristic information;
  generating a virtual card of the at least one speaker according to the biological characteristic information;
  overlaying the virtual card to the target audio-video stream data, and synthesizing the target audio-video stream data with other audio-video stream data in response to the at least piece of audio-video stream data comprising a plurality of audio-video stream data into a to-be-sent audio-video stream data; and
  sending the to-be-sent audio-video stream data to the plurality of participant terminals so as to enable the plurality of participant terminals to display the virtual card of the at least one speaker.

Optionally, in some embodiments of the present disclosure, in response to a plurality of pieces of different voiceprint characteristic information being simultaneously obtained from the target audio-video stream data, the method further includes:
  determining the at least one speaker as a plurality of speakers corresponding to the plurality of pieces of different voiceprint characteristic information.

Optionally, in some embodiments of the present disclosure, in response to a plurality of pieces of different voiceprint characteristic information being sequentially obtained from the target audio-video stream data within a preset duration, the method further includes:
  determining the at least one speaker as a plurality of speakers corresponding to the plurality of pieces of different characteristic information.

Optionally, in some embodiments of the present disclosure, overlaying the virtual card of the at least one speaker to the target audio-video stream data, includes:
  detecting a coordinate position of a face region of the at least one speaker from the target audio-video stream data;
  determining a target position and a size of the virtual card according to the coordinate position; and
  overlaying the virtual card to the target audio-video stream data according to the target position and the sized.

Optionally, in some embodiments of the present disclosure, in response to the face region being not detected in the target audio-video stream data, the method further, the method further includes:
  overlaying the virtual card to the target audio-video stream data according to a preset coordinate position.

Optionally, in some embodiments of the present disclosure, the overlaying the virtual card to the target audio-video stream data, includes:
  calculating average gray scale values of at least one image in the target audio-video stream data, wherein the average gray scale values correspond to each color channel of preset color channels respectively, adjusting chromaticity of the virtual card according to a proportion of the average gray scale values, and obtaining adjusted virtual card of the at least one speaker so as to enable a contrast between the chromaticity of the adjusted virtual card and a chromaticity of the at least one image to be greater than a preset value; and
  overlaying an adjusted virtual card of the at least one speaker to the target audio-video stream data.

Optionally, in some embodiments of the present disclosure, the determining the target position and the size of the virtual card according to the coordinate position, includes:
  determining coordinate positions of other regions except the face region in the target audio-video stream data according to the coordinate position of the face region;
  determining at least one communication region from the other regions according to the coordinate positions of the other regions;
  determining a target communication region from the at least one communication region, and a coordinate position of the target communication region, wherein an area of the target communication region is greater than a preset area; and
  determining the target position and the size of the virtual card according to the target communication region and the coordinate position of the target communication region.

Optionally, in some embodiments of the present disclosure, the determining the target position and the size of the virtual card according to the target communication region and the coordinate position of the target communication region, includes:
  according to a shape of a preset card, determining a region of a maximum area and a shape same as the shape of the preset card in the target communication region, and adjusting the target position and the size of the virtual card according to a coordinate position of the region.

Optionally, in some embodiments of the present disclosure, the determining the target position and the size of the virtual card according to the target communication region and the coordinate position of the target communication region, includes:
   determining an inscribed graph of a maximum area in the target communication region;
   taking a shape of the inscribed graph as a shape of the virtual card; and
   adjusting the target position and the size of the virtual card according to a coordinate position of the inscribed graph.

Optionally, in some embodiments of the present disclosure, the overlaying the virtual card to the target audio-video stream data, and synthesizing the target audio-video stream data with other audio-video stream data except the target audio-video stream data in the plurality of audio-video stream data into the to-be-sent audio-video stream data, include:
   according to a preset layout, synthesizing the target audio-video stream data overlaid with the virtual card with the other audio-video stream data except the target audio-video stream data in the plurality of audio-video stream data into the to-be-sent audio-video stream data, so that video pictures corresponding to the target audio-video stream data with the virtual card of the at least one speaker in the plurality of participant terminals are greater than video pictures corresponding to the other audio-video stream data.

Optionally, in some embodiments of the present disclosure, before receiving the plurality of audio-video stream data of the plurality of participant terminals in communication connection, the method further includes:
   storing corresponding relations between biological characteristic information and virtual cards of known participants in advance.

Optionally, in some embodiments of the present disclosure, in response to the biological characteristic information of the at least one speaker is not obtained from the target audio-video stream data, the method further includes:
   determining a video picture of the at least one speaker;
   receiving a screen capturing operation of a person with an entering authority aiming at the video picture, and responding to the screen capturing operation to determine the biological characteristic information of the at least one speaker;
   receiving a text input operation aiming at the video picture of the at least one speaker, and responding to the text input operation to determine the virtual card of the at least one speaker; and
   associating the biological characteristic information of the at least one speaker with the virtual card of the at least one speaker.

Optionally, in some embodiments of the present disclosure, in response to no speaker is detected from the plurality of audio-video stream data, the method further includes:
   determining a conference terminal corresponding to a conference host from the plurality of participant terminals, and taking audio-video stream data corresponding to the conference terminal as the target audio-video stream data.

Correspondingly, some embodiments of the present disclosure provide a device for sending a virtual card, applied to a server side, and including:
   a receiving unit, configured to receive at least one piece of audio-video stream data of a plurality of participant terminals in communication connection with the server side;
   a determining unit, configured to determine a target audio-video stream data corresponding to at least one speaker from the at least one piece of audio-video stream data;
   an obtaining unit, configured to obtain a biological characteristic information configured to identify the at least one speaker from the target audio-video stream data, wherein the biological characteristic information comprises at least one of a face characteristic information or a voiceprint characteristic information;
   a generating unit, configured to generate a virtual card of the at least one speaker according to the biological characteristic information of the at least one speaker;
   a synthesizing unit, configured to overlaid the virtual card to the target audio-video stream data, and synthesize the target audio-video stream data with other audio-video stream data in response to the at least one piece of audio-video stream data comprising a plurality of audio-video stream data into a to-be-sent audio-video stream data; and
   a sending unit, configured to send the to-be-sent audio-video stream data to the plurality of participant terminals so as to enable the plurality of participant terminals to display the virtual card.

Optionally, in some embodiments of the present disclosure, in response to the obtaining unit obtaining a plurality of pieces of different voiceprint characteristic information simultaneously from the target audio-video stream data, the determining unit is further configured to:
   determine the at least one speaker as a plurality of speakers corresponding to the plurality of pieces of different voiceprint characteristic information.

Optionally, in some embodiments of the present disclosure, in response to the obtaining unit obtaining a plurality of pieces of different voiceprint characteristic information sequentially from the target audio-video stream data, the determining unit is further configured to:
   determine the at least one speaker as a plurality of speakers corresponding to the plurality of pieces of different characteristic information.

Optionally, in some embodiments of the present disclosure, the synthesizing unit is configured to:
   detect a coordinate position of a face region of the at least one speaker from the target audio-video stream data;
   determine a target position and a size of the virtual card according to the coordinate position of the face region; and
   overlay the virtual card to the target audio-video stream data according to the target position and the size of the virtual card.

Optionally, in some embodiments of the present disclosure, in response to no face region of each speaker is detected in the target audio-video stream data, the synthesizing unit is further configured to:
   overlay the virtual card of the at least one speaker to the target audio-video stream data according to a preset coordinate position.

Optionally, in some embodiments of the present disclosure, the synthesizing unit is configured to:
   calculate average gray scale values of at least one image in the target audio-video stream data in each color channel of a preset color channel, adjust chromaticity of the virtual card of the at least one speaker according to a proportion of the average gray scale values corresponding to each color channel, and obtain the adjusted virtual card of the at least one speaker so as to enable a contrast between the chromaticity of the adjusted virtual card of the at least one speaker and chromaticity of the at least one image to be greater than a preset value; and overlay the adjusted virtual card of the at least one speaker to the target audio-video stream data.

Optionally, in some embodiments of the present disclosure, the synthesizing unit is configured to:
  determine coordinate positions of other regions according to the coordinate position of the face region of the speaker;
  determine at least one communication region from the other regions according to the coordinate positions of the other regions;
  determine a target communication region from the at least one communication region, and a coordinate position of the target communication region, wherein an area of the communication region is greater than a preset area; and
  determine the target position and the size of the virtual card according to the target communication region and the coordinate position of the target communication region.

Optionally, in some embodiments of the present disclosure, the synthesizing unit is configured to:
  according to a shape of a preset card, determine a region of a maximum area and a shape same as the shape of the preset card in the target communication region, and adjust the target position and the size of the virtual card of each speaker according to a coordinate position of the region.

Optionally, in some embodiments of the present disclosure, the synthesizing unit is configured to:
  determine an inscribed graph of the maximum area in the target communication region;
  take the inscribed graph of the maximum area as a shape of the virtual card of each speaker; and
  adjust the target position and the size of the virtual card of each speaker according to a coordinate position of the inscribed graph of the maximum area.

Optionally, in some embodiments of the present disclosure, the synthesizing unit is configured to:
  according to a preset layout, synthesize the target audio-video stream data overlaid with the virtual card of the at least one speaker with other audio-video stream data in response to the at least one piece of audio-video stream data including a plurality of audio-video stream data into the to-be-sent audio-video stream data, so that video pictures corresponding to the target audio-video stream data overlaid with the virtual card of the at least one speaker in the plurality of participant terminals are greater than video pictures corresponding to the other audio-video stream data.

Optionally, in some embodiments of the present disclosure, the device further includes a storage unit, configured to:
  store corresponding relations between biological characteristic information and virtual cards of known participants in advance.

Optionally, in some embodiments of the present disclosure, in response to the biological characteristic information of the at least one speaker being not obtained from the target audio-video stream data, the device further includes an entering unit, configured to:
  determine a video picture of the at least one speaker;
  receive a screen capturing operation of a person with an entering authority aiming at the respective video picture of the at least one speaker, and respond to the screen capturing operation to determine the biological characteristic information of the at least one speaker;
  receive a text input operation aiming at the video picture of the at least one speaker, and respond to the text input operation to determine the virtual card of the at least one speaker; and
  associate the biological characteristic information of the at least one speaker with the virtual card of the at least one speaker.

Correspondingly, some embodiments of the present disclosure provide a system for sending a virtual card, wherein the sending system includes a server side and a plurality of participant terminals in communication connection with the server side;
  the server side is configured to receive at least one piece of audio-video stream data of the plurality of participant terminals in communication connection with the server side;
  the server side is further configured to determine a target audio-video stream data corresponding to at least one speaker from the at least one piece of audio-video stream data;
  the server side is further configured to obtain a biological characteristic information configured to identify the at least one speaker from the target audio-video stream data, wherein the biological characteristic information comprises at least one of a face characteristic information or a voiceprint characteristic information;
  the server side is further configured to generate a virtual card of the at least one speaker according to the biological characteristic information of the at least one speaker, overlay the virtual card to the target audio-video stream data, synthesize the target audio-video stream data with other audio-video stream data in response to the at least one piece of audio-video stream data comprising a plurality of audio-video stream data into a to-be-sent audio-video stream data, and send the to-be-sent audio-video stream data to the plurality of participant terminals; and
  the plurality of participant terminals are configured to display the virtual card.

Optionally, in some embodiments of the present disclosure, the server side includes a conference server and a characteristic identification server in communication connection with the conference server, the conference server is configured to receive the at least one piece of audio-video stream data, determine the target audio-video stream data from the at least one piece of audio-video stream data, determine the virtual card corresponding to the biological characteristic information of the at least one speaker by calling a characteristic detection and identification interface of the characteristic identification server, and send the to-be-sent audio-video stream data overlaid with the virtual card to the plurality of participant terminals; and
  the characteristic identification server is configured to identify the biological characteristic information configured to identify the at least one speaker from the target audio-video stream data and send the biological characteristic information of the at least one speaker to the conference server.

Optionally, in some embodiments of the present disclosure, the plurality of participant terminals are further configured to:
  display a video picture corresponding to the target audio-video stream data overlaid with the virtual card in a mode of an area of the video picture being greater than an area of video pictures corresponding to the other audio-video stream data in response to the at least one piece of audio-video stream data comprising the plurality of audio-video stream data.

Correspondingly, some embodiments of the present disclosure provide a device for sending a virtual card, including:

a memory and a processor, wherein
the memory is configured to store computer programs; and
the processor is configured to perform the computer programs in the memory so as to implement followings:
receiving at least one piece of audio-video stream data of a plurality of participant terminals in communication connection with a server side;
determining a target audio-video stream data corresponding to at least one speaker from the at least one of audio-video stream data;
obtaining a biological characteristic information configured to identify the at least one speaker from the target audio-video stream data, wherein the biological characteristic information comprises at least one of a face characteristic information or a voiceprint characteristic information;
generating a virtual card of the at least one speaker according to the biological characteristic information of the at least one speaker;
overlaying the virtual card to the target audio-video stream data, and synthesizing the target audio-video stream data with other audio-video stream data in response to the at least one piece of audio-video stream data comprising a plurality of audio-video stream data into a to-be-sent audio-video stream data; and
sending the to-be-sent audio-video stream data to the plurality of participant terminals so as to enable the plurality of participant terminals to display the virtual card.

Correspondingly, some embodiments of the present disclosure provide a computer non-transient readable storage medium, wherein
the computer non-transient readable storage medium stores a computer instruction, and when the computer instruction is executed on a computer, the computer executes the above method for sending the virtual card.

DETAILED DESCRIPTION OF THE EMBODIMENTS

In order to enable the objectives, technical solutions, and advantages of the embodiments of the present disclosure to be clearer, the embodiments of the present disclosure will be described in further detail below with reference to the accompanying drawings of the embodiments of the present disclosure. Apparently, the described embodiments are merely some, but not all embodiments of this disclosure. Also, the embodiments and features in the embodiments of the present disclosure may be combined with one another without conflict. Based on the embodiments in the present disclosure, all other embodiments obtained by those ordinarily skilled in the art without involving any inventive effort are within the scope of protection of the present disclosure.

Unless defined otherwise, technical or scientific terms used in the present disclosure should be of the ordinary meaning understood by those ordinary skilled in the art to which this disclosure belongs. As used in the present disclosure, the word "comprise" or "include", and the like, means that an element or article that precedes the word contains the element or article listed after the word and equivalents thereof, but does not exclude other elements or articles.

In the related art, a remote video conference has the technical problem that card sharing efficiency is low.

Therefore, some embodiments of the present disclosure provide a method, device and system for sending a virtual card and a readable storage medium, which are configured to improve the business card sharing efficiency of a remote video conference.

Figure 1:
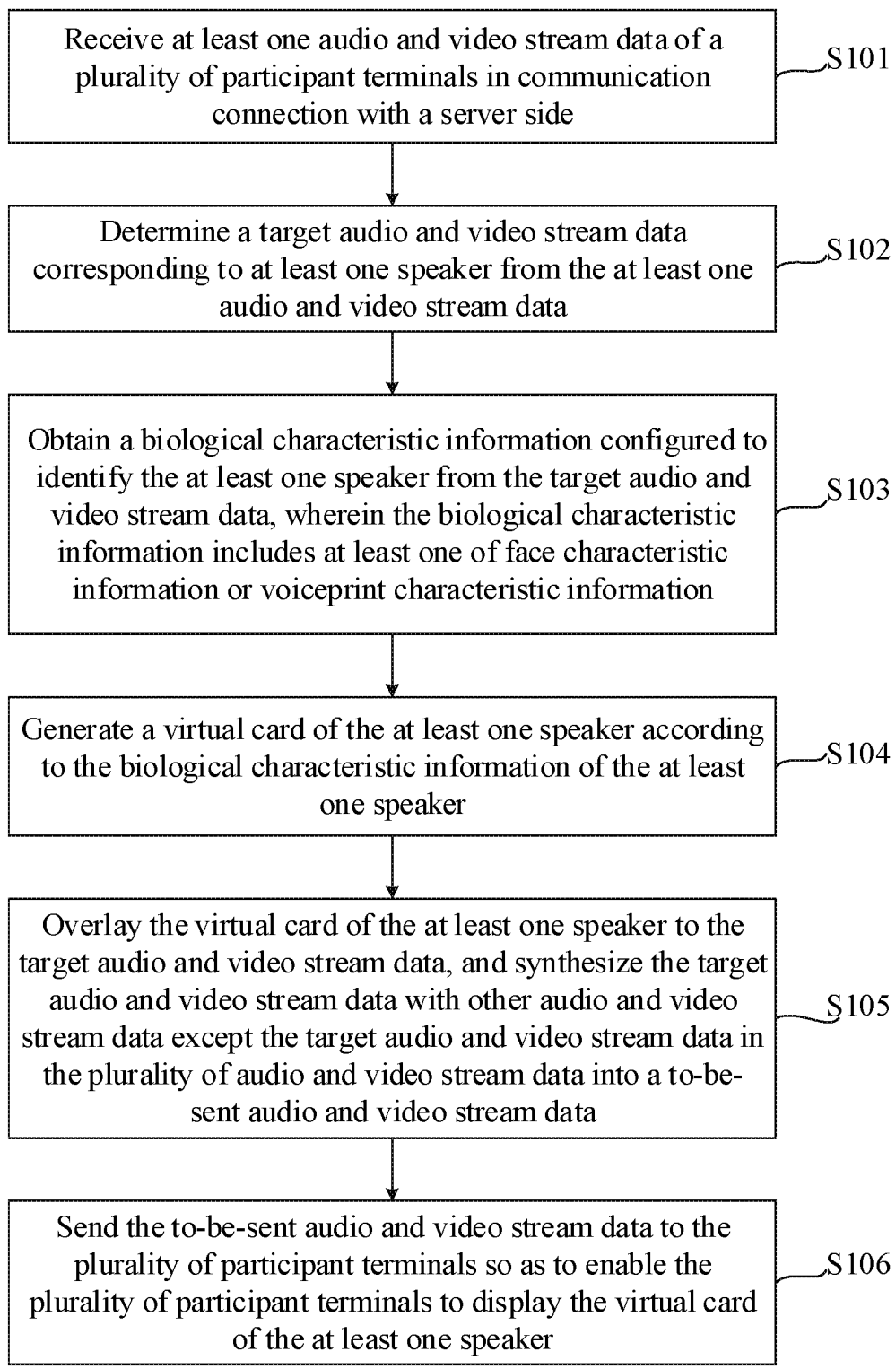
FIG. 1 is a method flowchart of a method for sending a virtual card according to an embodiment of the present disclosure.

As shown in FIG. 1, the embodiment of the present disclosure provides a method for sending a virtual card, applied to a server side, and including followings.

S101: at least one audio-video stream data of a plurality of participant terminals in communication connection with the server side is received.

In some embodiments, the server side includes a conference server and a characteristic identification server in communication connection with the conference server, the conference server includes a streaming media service module and a conference management service module, and the streaming media service module is configured to process the audio-video stream data and may be used for audio and video coding and decoding, face identification interface calling for face recognition, video image overlay, audio and video real-time communication and the like. The conference management service module is configured to process video conference services, such as conference participant management, conference reservation, conference joining, conference notification, conference control, sharing cooperation, background management and the like. The characteristic identification server may deploy a face detection algorithm and a face identification algorithm, and is configured to carry out face detection on a received video image, further carry out face identification on the detected face image, compare a face library, and search for participant information corresponding to the face. The characteristic identification server may also deploy audio detection and voiceprint characteristic identification algorithms for audio detection of received audio and further voiceprint feature recognition of the detected audio. Each of the plurality of participant terminals may be a computer, a mobile phone, a tablet computer, a conference all-in-one machine, etc., and is not limited herein. Each participant terminal may be equipment which integrates audio and video devices such as a camera, and a microphone, and also may be equipment which is connected with the audio and video devices such as the camera, and the microphone, so that each participant terminal can obtain the corresponding audio-video stream data.

In the remote video conference, when the plurality of participant terminals are in communication connection, the server side may receive the audio-video stream data from each participant terminal, for example, when the number of the plurality of participant terminals in communication connection is three, the server side may receive the audio-video stream data from the three participant terminals respectively, so that the server side can receive the three audio-video stream data of the three participant terminals. For another example, when the number of the participant terminals in communication connection is five, the server side may receive the audio-video stream data respectively from the five participant terminals, so that the server side can receive the five audio-video stream data of the five participant terminals. Of course, the number of the plurality of participant terminals may be set according to actual application, and is not limited herein.

S102: a target audio-video stream data corresponding to at least one speaker is determined from the at least one audio-video stream data.

In some embodiments, the at least one speaker may be a speaking person, meaning that there is a speaker in participants using the participant terminal as long as there is sound in the audio-video stream data of a certain participant terminal. When the at least one speaker is one, it can be determined that the participant using the participant terminal is the currently speaking speaker by detecting the audio information of the participant terminal, and the specific detection is the same as the related art, and is not limited herein. Further, the at least one speaker may be a plurality of speakers, and in actual application, the at least one speaker may be a host or any participant other than the host, which is not limited herein.

In some embodiments, there is/are one piece or multiple pieces of the target audio-video stream data may be one or multiple, when there are multiple pieces of the target audio-video stream data, correspondingly, the at least one speaker is multiple, and the multiple speakers may be in different target audio-video stream data. For example, the target audio-video stream data are three, the at least one speaker is three, and the three speakers may be respectively in the three different audio-video stream data. For another example, the target audio-video stream data are three, the at least one speaker is five, three of the speakers are simultaneously in one target audio-video stream data, and the other two speakers are respectively in the other two different target audio-video stream data. In addition, when the target audio-video stream data is one and the at least one speaker is multiple, the multiple speakers are in the same audio-video stream data. Of course, in actual application, the relationship between the at least one speaker and the target audio-video stream data may also be other cases and will not be described in detail herein.

S103: respective biological characteristic information configured to identify the at least one speaker is obtained from the target audio-video stream data, wherein the biological characteristic information includes at least one of face characteristic information and voiceprint characteristic information.

In some embodiments, a face identification method may be adopted to obtain the respective face characteristic information of the at least one speaker from the target audio-video stream data, a voiceprint identification method may also be adopted to obtain the respective voiceprint characteristic information of the at least one speaker from the target audio-video stream data, and specific implementations of the face identification method and the voiceprint identification method are the same as the related art, and will not be described in detail herein.

S104: a respective virtual card of the at least one speaker is generated according to the respective biological characteristic information of the at least one speaker.

In some embodiments, after the respective biological characteristic information configured to identify the at least one speaker is obtained from the target audio-video stream data, the respective virtual card of the at least one speaker may be generated according to the respective biological characteristic information of the at least one speaker, and due to different pieces of biological characteristic information corresponding to different participants, specific contents of the generated virtual cards are correspondingly different. For example, for a speaker A, the business card of the speaker A corresponds to a virtual card a, and for a speaker B, the business card of the speaker B corresponds to a virtual card b. In addition, if the biological characteristic information of the plurality of different speakers is obtained from the target audio-video stream data, i.e. the at least one speaker is multiple, correspondingly, the virtual cards corresponding to the speakers will be generated according to the biological characteristic information of the plurality of different speakers, for example, when the at least one speaker is three, three virtual cards are generated, wherein each virtual card corresponds to a speaker associated with the corresponding biological characteristic information, of course, the cases of the generated virtual cards may be other cases, which is not limited herein.

S105: the respective virtual card of the at least one speaker is overlaid to the target audio-video stream data, and the target audio-video stream data are synthesized with other audio-video stream data except the target audio-video stream data in the plurality of audio-video stream data into a audio-video stream data to-be-sent.

In some embodiments, after the virtual card corresponding to the respective biological characteristic information of the at least one speaker is generated, the virtual card of the at least one speaker is overlaid to the target audio-video stream data, and is synthesized with other audio-video stream data except the target audio-video stream data in the plurality of audio-video stream data into a to-be-sent audio-video stream data, so that the respective virtual card of the at least one speaker can be shared to all the participant terminals, and thus the sharing efficiency of the business card is guaranteed.

S106: the to-be-sent audio-video stream data are sent to the plurality of participant terminals so as to enable the plurality of participant terminals to display the respective virtual card of the at least one speaker.

In some embodiments, after the target audio-video stream data overlaid with the respective virtual card of the at least one speaker and the other audio-video stream data are synthesized into one to-be-sent audio-video stream data, the synthesized to-be-sent audio-video stream data can be sent to the plurality of participant terminals, and therefore each participant terminal in the plurality of participant terminals can display the respective virtual card of the at least one speaker. Accordingly, users using the corresponding participant terminals may share the business cards of all speakers through the corresponding participant terminals, so that the sharing efficiency of the business cards is guaranteed, and the conference communication efficiency is improved.

In some embodiments of the present disclosure, if a plurality of pieces of different voiceprint characteristic information are simultaneously obtained from the target audio-video stream data, the method further includes:

the at least one speaker is determined as a plurality of speakers corresponding to the plurality of pieces of different voiceprint characteristic information.

In some embodiments, if the plurality of pieces of different voiceprint characteristic information are simultaneously obtained from the target audio-video stream data, the different voiceprint characteristic information identifies different participants, at the moment, the participants respectively corresponding to the plurality of pieces of different voiceprint characteristic information are speaking, i.e. a plurality of people are speaking currently, and a plurality of speakers are speaking, accordingly, the at least one speaker is a plurality of speakers corresponding to the plurality of pieces of different voiceprint characteristic information, and the plurality of speakers may be speakers using the same participant terminal or speakers using different participant terminals. For example, three pieces of different pieces of voiceprint characteristic information S1, S2 and S3 are simultaneously obtained from the target audio-video stream data, wherein the voiceprint characteristic information S1 is from the audio-video stream data of a participant terminal 1, the voiceprint characteristic information S2 is from the audio-video stream data of a participant terminal 2, and the voiceprint characteristic information S3 is from the audio-video stream data of a participant terminal 3, and accordingly, the speakers corresponding to the three pieces of different voiceprint characteristic information S1, S2 and S3 are speakers using different participant terminals respectively. Of course, in actual application, the case where the at least one speaker is multiple may also be other cases and will not be described in detail herein. When the at least one speaker is identified to be multiple, the business cards of the plurality of speakers may be displayed when the business cards are shared subsequently, so that the sharing efficiency is improved.

In some embodiments of the present disclosure, if a plurality of pieces of different voiceprint characteristic information are sequentially obtained from the target audio-video stream data within a preset duration, the method further includes:

the at least one speaker is determined as a plurality of speakers corresponding to the plurality of pieces of different characteristic information.

In some embodiments, if the plurality of different pieces of voiceprint characteristic information are sequentially obtained from the target audio-video stream data within a preset duration, the preset duration may be a duration set according to actual use habits of a user, and may also be a duration manually set by the user, which is not limited herein. For example, the preset duration is 30 s, and within 30 s, three pieces of different voiceprint characteristic information S4, S5 and S6 are sequentially obtained from the target audio-video stream data, such as a multi-person conversation scene in the same participant terminal and a multi-person conversation scene in different participant terminals, wherein a plurality of speakers exist at the moment. When the business cards are shared subsequently, the business cards of the plurality of speakers may be displayed, so that the sharing efficiency is improved.

Figure 2:
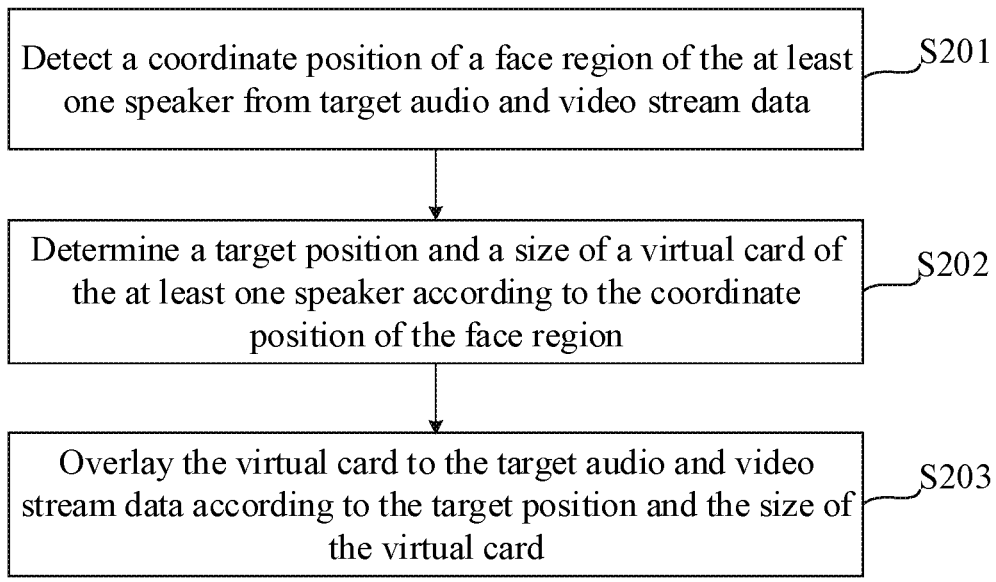
FIG. 2 is one method flowchart of step S105 in a method for sending a virtual card according to an embodiment of the present disclosure.

In some embodiments of the present disclosure, as shown in FIG. 2, step S105: overlaying the respective virtual card of the at least one speaker to the target audio-video stream data, includes:

S201: for each of the at least one speaker, a coordinate position of a face region of the corresponding speaker is detected from the target audio-video stream data;

S202: a target position and a size of the virtual card of the speaker are determined according to the coordinate position of the face region of the speaker; and S203: the virtual card is overlaid to the target audio-video stream data according to the target position and the size of the virtual card.

In some embodiments, the specific implementation process of the steps S201 to S203 is as follows.

Firstly, when the face region exists in the target audio-video stream data, aiming at each of the at least one speaker, the coordinate position of the face region of the corresponding speaker is detected from the target audio-video stream data, and then the target position and the size of the virtual card of the speaker are determined according to the coordinate position of the face region of the speaker, such as according to the coordinate position of the face region of the speaker, a chest position or a head position of the speaker is calculated, the calculated chest position is taken as the target position of the virtual card, or the calculated head position is taken as the target position of the virtual card. For example, the coordinate positions of the face region of the speaker are (x0,y0), (x1,y0), (x0,y1), (x1,y1), the virtual card may be overlaid by taking the position from five coordinate positions below the face region as the target position, and the virtual card may be overlaid from the coordinate position (x0,y1+5). In addition, when the size of the virtual card is fixed, if the bottom of the virtual card exceeds an image region of a corresponding video picture, for example, the height of the video picture is y, the height of the virtual card is h, if after the virtual card is overlaid, y1+5+h>y, and the bottom of the virtual card exceeds the video picture, the content of the virtual card cannot be completely displayed, the coordinate position of the overlaid virtual card may be adjusted from (x0,y1+5) to (x0,y−h), and the bottom of the virtual card is flush with the bottom of the corresponding video picture, so that the complete display of the virtual card is guaranteed, and the sharing quality of the virtual card is guaranteed.

Then, according to the target position of the virtual card, the virtual card is overlaid to the target audio-video stream data, for example, the virtual card is overlaid to the chest position of the corresponding speaker. In some embodiments, identity information of the corresponding speaker may be drawn on a semi-transparent business card picture to generate a virtual card, and then the virtual card is overlaid on the target audio-video stream data according to the target position. Since the target position of the virtual card is the position determined according to the coordinate position of the face region of the speaker, the virtual card may be displayed at the proper position of the speaker, so that the correct association between the speaker and the virtual card is ensured, and the sharing efficiency of the virtual card is improved.

In some embodiments of the present disclosure, if no face region of the at least one speaker is detected in the target audio-video stream data, the method further includes:

the virtual card of the at least one speaker is overlaid to the target audio-video stream data according to a preset coordinate position.

In some embodiments, the preset coordinate position may be a position preset by those skilled in the art according to actual application requirements. If the at least one speaker does not start a camera of the corresponding terminal, or turns back to the camera of the corresponding terminal, or the side face of the at least one speaker faces the camera of the corresponding terminal, the correlation between the at least one speaker and the voiceprint characteristic information may be entered in advance, and when no face region of the at least one speaker is detected in the target audio-video stream data, the virtual card corresponding to the at least one speaker may be determined according to the respective voiceprint characteristic information of the at least one speaker, and then the respective virtual card of the at least one speaker is overlaid into the target video stream data according to the preset coordinate position, for example, when the preset coordinate position is the lower right corner of the corresponding video picture, the virtual card is displayed in the lower right corner of the corresponding video picture of the corresponding speaker, for another example, when the preset coordinate position is the lower left corner of the corresponding video picture, the virtual card is displayed in the lower left corner of the corresponding video picture of the corresponding speaker, of course, the specific position of the preset coordinate position may also be set according to actual application requirements, which is not limited herein.

Figure 3:
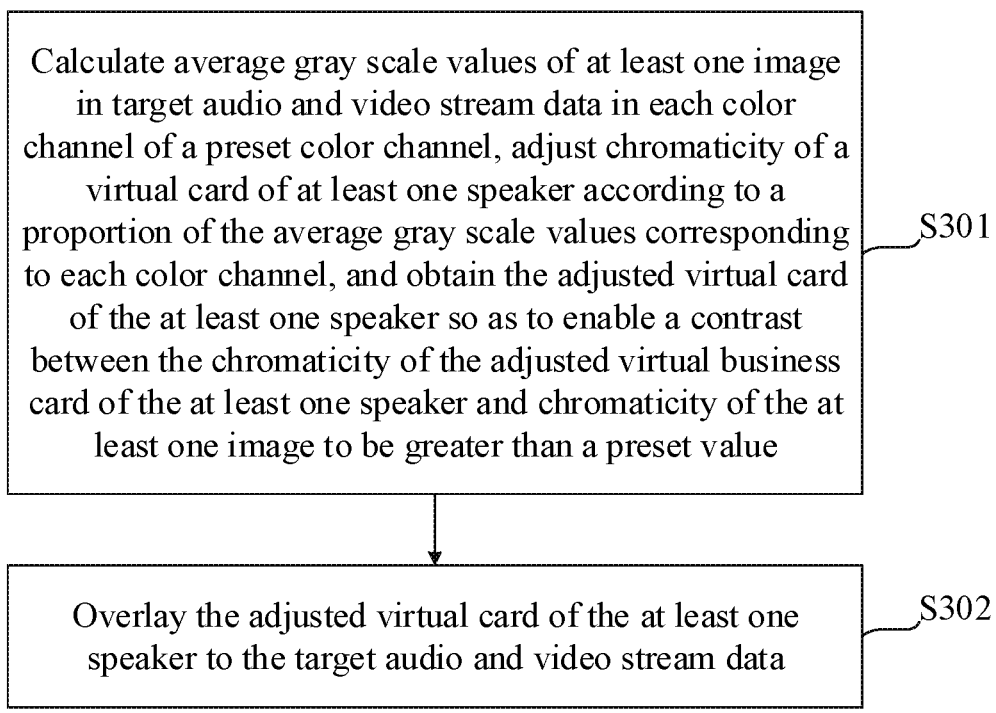
FIG. 3 is one method flowchart of step S105 in a method for sending a virtual card according to an embodiment of the present disclosure.

In some embodiments of the present disclosure, as shown in FIG. 3, step S105: overlaying the virtual card of the at least one speaker to the target audio-video stream data, includes:

S301: a corresponding average gray scale value of at least one image in the target audio-video stream data in each color channel of a preset color channel is calculated, chromaticity of the respective virtual card of the at least one speaker is adjusted according to a proportion of the average gray scale value corresponding to each color channel, and the respective adjusted virtual card of the at least one speaker is obtained so as to enable a contrast between the chromaticity of the respective adjusted virtual card of the at least one speaker and chromaticity of the at least one image to be greater than a preset value; and S302: the respective adjusted virtual card of the at least one speaker is overlaid to the target audio-video stream data.

In some embodiments, the specific implementation process of the steps S301 to S302 is as follows.

Firstly, the average gray level value corresponding to each color channel of at least one image in the target audio-video stream data in the preset color channel is calculated, wherein the at least one image may be one image or a plurality of images, the target audio-video stream data usually include the plurality of images, and the at least one image may be screened out of the plurality of images contained in the target audio-video stream data. In addition, the preset color channel may be an RGB channel including three color channels of red, green and blue, and the preset color channel may also be an HSV channel including hue (H), saturation (S) and value (V), of course, the preset color channel may be set in advance according to actual application requirements, which is not limited herein. After the preset color channel is set, the average gray scale value corresponding to each color channel included in the preset color channel of the at least one image may be calculated, for example, the at least one image is taken as a target image and the preset color channel is taken as the RGB channel, the specific calculation process of the corresponding average gray scale value of the target image in the R channel is that the brightness of each pixel point of the target image on the R channel is added, and divided by a total number of the pixel points of the target image, so the corresponding average gray scale value of the target image in the R channel is determined. Based on the same calculation principle, the corresponding average gray scale value of the target image in the G channel and the corresponding average gray scale value of the target image in the B channel can be calculated, so that the proportion of the average gray scale value corresponding to each color channels is determined.

After the proportion of the average gray scale value corresponding to each color channel is determined, a key color channel may be determined according to the average gray scale value corresponding to each color channel, and then the chromaticity of the virtual card of the at least one speaker is adjusted according to the key color channel, so that the contrast between the chromaticity of the respective adjusted virtual card of the at least one speaker and the chromaticity of the at least one image is greater than the preset value. The preset value is a preset value according to actual application requirements, for example, the preset value is 90%. For example, the background of the at least one image is black, if the content in the virtual card is still displayed by adopting a black font, a contrast ratio between the virtual card and the at least one image is small, the related content of the virtual card cannot be clearly determined for participants, and the sharing quality of the virtual card is poor. Still taking the RGB color channel as an example, if the corresponding average gray scale value of the target image in the R channel is greater than the average gray scale value corresponding to the G channel and greater than the average gray scale value corresponding to the B channel, the chromaticity of the virtual card of the at least one speaker may be adjusted by adopting the color channel with the opposite average gray scale value proportion, for example, the gray scale distribution of the respective virtual card of the at least one speaker is adjusted, the proportion of the average gray scale value of the R channel of the respective virtual card of the at least one speaker is reduced, and the proportion of the average gray scale value of the G channel and the proportion of the average gray scale value of the B channel are correspondingly increased, so that the chromaticity of the virtual card of the at least one speaker is adjusted.

After the chromaticity of the virtual card of the at least one speaker is adjusted, the respective adjusted virtual card of the at least one speaker is obtained, so that the contrast between the chromaticity of the respective adjusted virtual card of the at least one speaker and the chromaticity of the at least one image is greater than the preset value. Then the respective adjusted virtual card of the at least one speaker is overlaid on the target audio-video stream data, so that the contrast between the respective virtual card of the at least one speaker and the at least one image is improved. For example, when the background of the at least one image is black, the content in the virtual card may be displayed in a white font, thereby ensuring the sharing effect of the virtual card.

In addition, in some embodiments, virtual cards with different formats may be preset, such as virtual cards with different font sizes and virtual cards with different font colors, and in some embodiments, business cards with better contrast may be selected from the virtual cards with different formats according to the proportion of the average gray scale value corresponding to each color channel of at least one image in the target audio-video stream data in the preset color channel, and overlaid into the target audio-video stream data, thereby ensuring the sharing effect of the virtual card.

Figure 4:
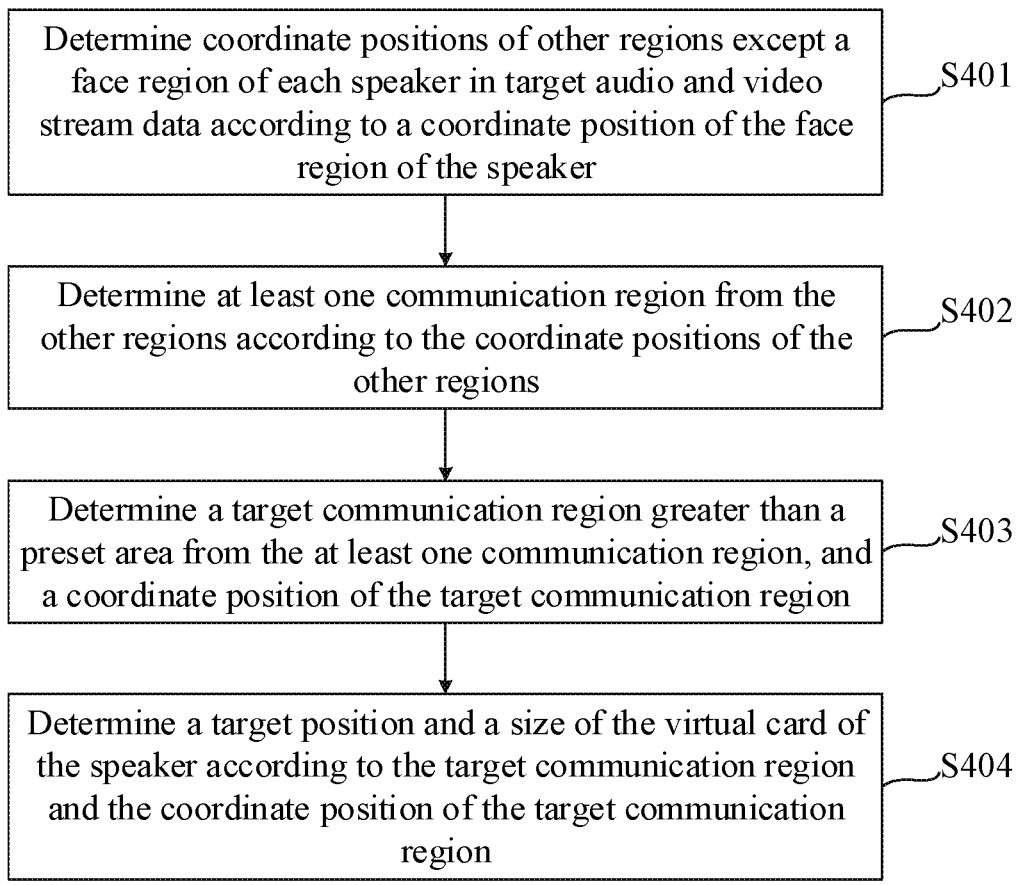
FIG. 4 is a method flowchart of step S202 in a method for sending a virtual card according to an embodiment of the present disclosure.

In some embodiments of the present disclosure, as shown in FIG. 4, step S202: determining the target position and the size of the virtual card of each speaker according to the coordinate position of the face region of the speaker, includes:
  S401: coordinate positions of other regions except the face region of the speaker in the target audio-video stream data are determined according to the coordinate position of the face region of the speaker;
  S402: at least one communication region is determined from the other regions according to the coordinate positions of the other regions;
  S403: a target communication region greater than a preset area is determined from the at least one communication region, and a coordinate position of the target communication region is determined; and
  S404: the target position and the size of the virtual card of the speaker are determined according to the target communication region and the coordinate position of the target communication region.

In some embodiments, the specific implementation process of the steps S401 to S404 is as follows.

Firstly, according to the coordinate position of the face region of the speaker, the coordinate positions of other regions except the face region of the speaker in the target audio-video stream data are determined, such as a region C in addition to the face region of the speaker, and then the at least one communication region is determined from the other regions according to the coordinate positions of the other regions, for example, the region C includes four communication regions of the region c1, the region c2, the region c3, and the region c4, and then the target communication region greater than the preset area is determined from the at least one communication region, which may be the region with the largest area among the at least one communication region, and the coordinate position of the target communication region is determined. For example, if it is determined from the four communication regions of the regions c1-c4 that the communication region with the largest area is c1, and the coordinate position of the communication region c1 is determined, so that the communication region c1 may be taken as the target communication region. Then, the target position and the size of the virtual card of the speaker are determined according to the coordinate position of the target communication region, so that the virtual card can be overlaid by selecting the region with the largest area in the residual communication regions in the target audio-video stream data, the complete display of the virtual card is guaranteed, and the display quality of the virtual card is guaranteed.

In some embodiments of the present disclosure, for step S404: the target position and the size of the virtual card of the speaker are determined according to the target communication region and the coordinate position of the target communication region, there may be, but are not limited to, the following two implementations, and a first implementation includes:
  according to a shape of a preset business card, a maximum-area region the same as the shape of the preset business card in the target communication region is determined, and the target position and the size of the virtual card of the speaker is adjusted according to a coordinate position of the maximum-area region.

In some embodiments, the shape of the preset business card may be a default business card shape of a system and may also be a business card shape manually set by a conference administrator, and the shape of the preset business card may be one of a right-angled rectangle, a rounded rectangle, a circle, a triangle, a trapezoid and a square, which is not limited herein. When the shape of the preset business card is fixed, the maximum-area region the same as the shape of the preset business card is determined from the target communication region according to the shape of the preset business card. For example, when the preset business card is the rounded rectangle, the maximum-area region with the same shape as the rounded rectangle is determined from the target communication region, the shape of the maximum-area region is also the rounded rectangle, at the moment, the target position and the size of the virtual card of the speaker are adjusted according to the coordinate position of the maximum-area region, it may be that the virtual card of the speaker fills the position of a center region of the maximum-area region, the region occupied by the virtual card of the speaker is at a certain distance from the edge of the maximum-area region, so that the target position and the size of the virtual card of the speaker are adjusted according to the maximum-area region, and better sharing quality of the virtual card of the speaker is guaranteed.

Figure 5:
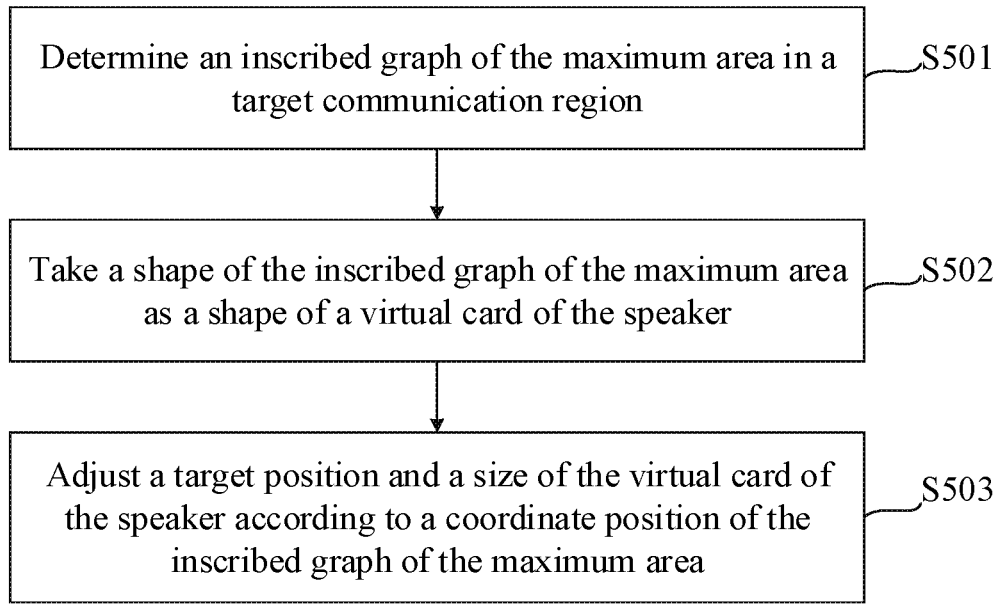
FIG. 5 is a method flowchart of a second implementation mode of step S404 in a method for sending a virtual card according to an embodiment of the present disclosure.

In some embodiments of the present disclosure, a second implementation of step S404 is shown in FIG. 5, optionally, step S404: determining the target position and the size of the virtual card of the speaker according to the target communication region and the coordinate position of the target communication region, includes:
  S501: an inscribed graph of the maximum area in the target communication region is determined;
  S502: the inscribed graph of the maximum area is taken as a shape of the virtual card of the speaker; and
  S503: the target position and the size of the virtual card of the speaker are adjusted according to a coordinate position of the inscribed graph of the maximum area.

In some embodiments, the specific implementation process of the steps S501 to S503 is as follows.

Firstly, the inscribed graph of the maximum area in the target communication region is determined, the inscribed graph of the maximum area in the business card shape may be determined from the target communication region according to the preset business card shape, and the inscribed graph of the maximum area may be directly determined from the target communication region. The preset business card shape may be a variety of business card shapes preset by the system, and may also be a variety of business card shapes manually set by the conference administrator, for example, the variety of business card shapes includes at least two of a right-angle rectangle, a rounded rectangle, a circle, an ellipse, a triangle, a trapezoid and a square, and of course, may be a combination of other variety of shapes, which is not limited herein. After the inscribed graph of the maximum area in the target communication region is determined, the coordinate position of the inscribed graph of the maximum area is taken as the shape of the virtual card of the speaker, and the target position and the size of the virtual card of the speaker are adjusted according to the coordinate position of the inscribed graph of the maximum area, it may be that the virtual card of the speaker fills the region where the inscribed graph of the maximum area is located, it may also be that the virtual card of the speaker is set on a center region of the region where the inscribed graph of the maximum area is located, and the region occupied by the virtual card of the speaker is at a certain distance from the edge of the region where the inscribed graph of the maximum area is located, so that the target position and the size of the virtual card of the speaker are adjusted according to the inscribed graph of the maximum area, then it is ensured that when the target communication region is fixed, display of the virtual card is maximized, and display quality of the virtual card is guaranteed.

In some embodiments of the present disclosure, step S105: overlaying the respective virtual card of the at least one speaker to the target audio-video stream data, and synthesizing the target audio-video stream data with other audio-video stream data except the target audio-video stream data in the plurality of audio-video stream data into the to-be-sent audio-video stream data, include:

according to a preset layout, the target audio-video stream data overlaid with the respective virtual card of the at least one speaker are synthesized with other audio-video stream data except the target audio-video stream data in the plurality of audio-video stream data into the to-be-sent audio-video stream data, so that video pictures corresponding to the target audio-video stream data overlaid with the respective virtual card of the at least one speaker in the plurality of participant terminals are greater than video pictures corresponding to the other audio-video stream data.

Figure 6:
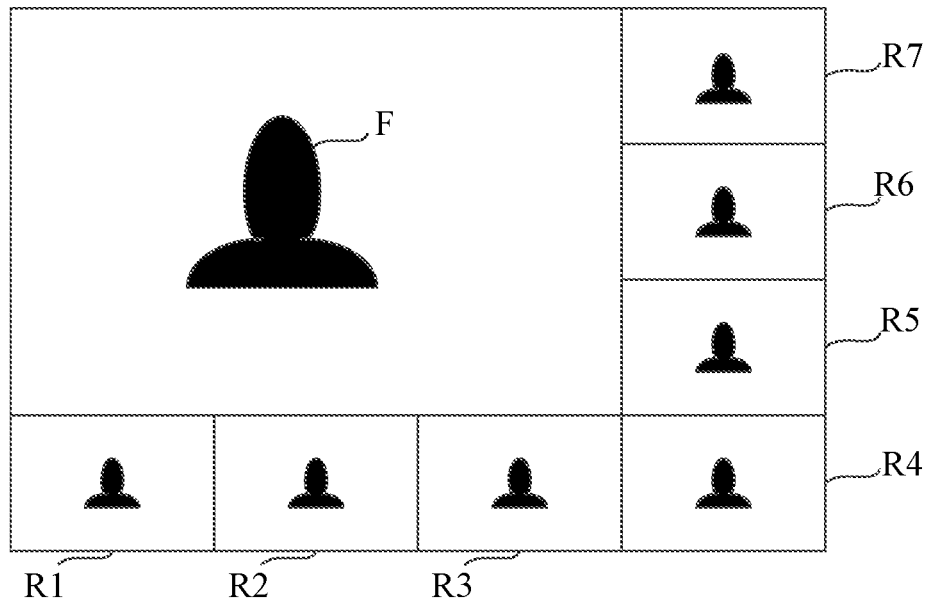
FIG. 6 is one schematic diagram of a preset layout in a method for sending a virtual card according to an embodiment of the present disclosure.
Figure 7:
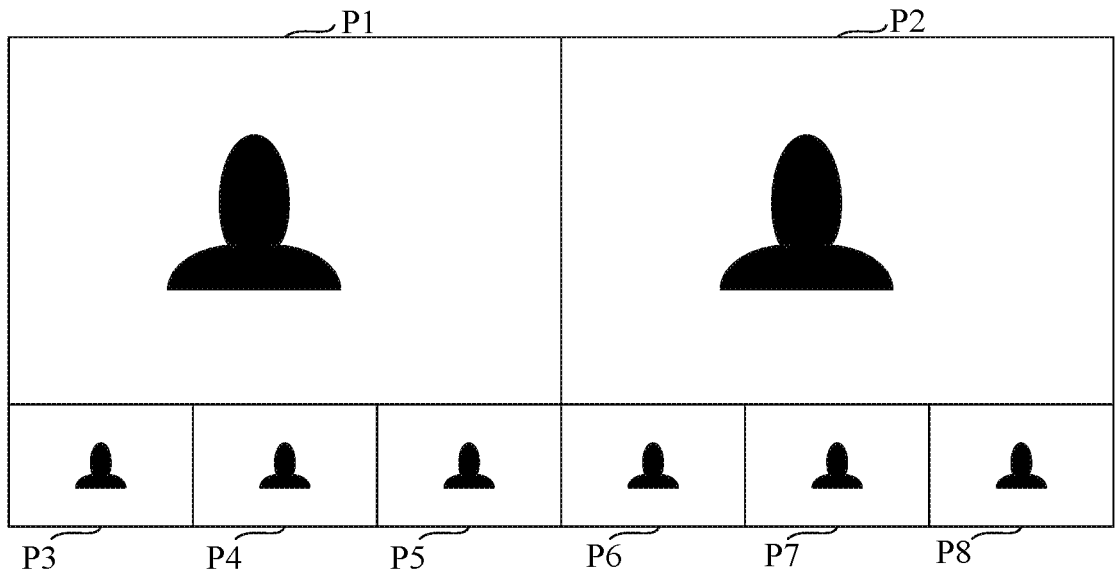
FIG. 7 is one schematic diagram of a preset layout in a method for sending a virtual card according to an embodiment of the present disclosure.

In some embodiments, according to the preset layout, the target audio-video stream data overlaid with the respective virtual card of the at least one speaker are synthesized with other audio-video stream data except the target audio-video stream data in the plurality of audio-video stream data into the to-be-sent audio-video stream data, it may be that the respective virtual card of the at least one speaker is overlaid to the target audio-video stream data, then the target audio-video stream data overlaid with the respective virtual card of the at least one speaker are synthesized with other audio-video stream data except the target audio-video stream data in the plurality of audio-video stream data into the to-be-sent audio-video stream data, and in some embodiments, the preset layout may be that a video picture of the terminal corresponding to the at least one speaker is displayed in a large picture, and video pictures of participant terminals corresponding to other participants except the at least one speaker are displayed in a small picture. FIG. 6 is one schematic diagram of a preset layout when the at least one speaker is one, in which a video picture of the speaker F is shown in a large view, and video pictures of other participants R1-R7 using different participant terminals are shown at the bottom and right around the video picture of the speaker F. Therefore, after each participant terminal in the plurality of participant terminals receives the to-be-sent audio-video stream data, the video picture corresponding to the target audio-video stream data overlaid with the virtual card of each participant terminal is displayed in a manner of being larger than the video picture corresponding to the other audio-video stream data. As shown in FIG. 7, the at least one speaker is two, and the two speakers such as P1 and P2 respectively appear in video pictures of two different participant terminals, the video picture corresponding to the speaker P1 has the same view size as the video picture corresponding to the speaker P2, and the video pictures of the other participants P3-P8 are shown at the bottom of the video pictures of the speakers P1 and P3. Of course, the video picture of the at least one speaker may also be set according to actual application requirements, which is not described in detail herein.

In some embodiments of the present disclosure, before step S101: receiving the plurality of audio-video stream data of the plurality of participant terminals in communication connection, the method further includes:

corresponding relations between biological characteristic information and virtual cards of known participants are stored in advance.

In some embodiments, before receiving the plurality of audio-video stream data of the plurality of participant terminals in communication connection, the corresponding relations between the biological characteristic information and the virtual cards of the known participants are stored in advance, it may be that the corresponding relations between face pictures and the virtual cards of the known participants are entered in advance, and/or the corresponding relations between audio files and the virtual cards of the known participants are entered in advance, and the corresponding relations are stored. For example, before entering a remote video conference system, the face picture and corresponding personnel information (virtual card) of each participant are entered into the system, it may be that a background administrator logs into the remote video conference system and submits the face pictures and corresponding personnel information (virtual cards) of the participants, or it may also be that each participant logs into the remote video conference system respectively and submits the respective face picture and personnel information (virtual card). For another example, before entering the remote video conference system, the audio file and corresponding personnel information (virtual card) of each participant are entered into the system. Therefore, when the speaker is a known participant of the known face picture and the virtual card, or the speaker is a known participant of the known audio file and the virtual card, the virtual card of the speaker may be quickly determined according to the pre-stored corresponding relations between the biological characteristic information and the virtual cards of the known participants, thereby ensuring the sharing efficiency of the virtual card.

Figure 8:
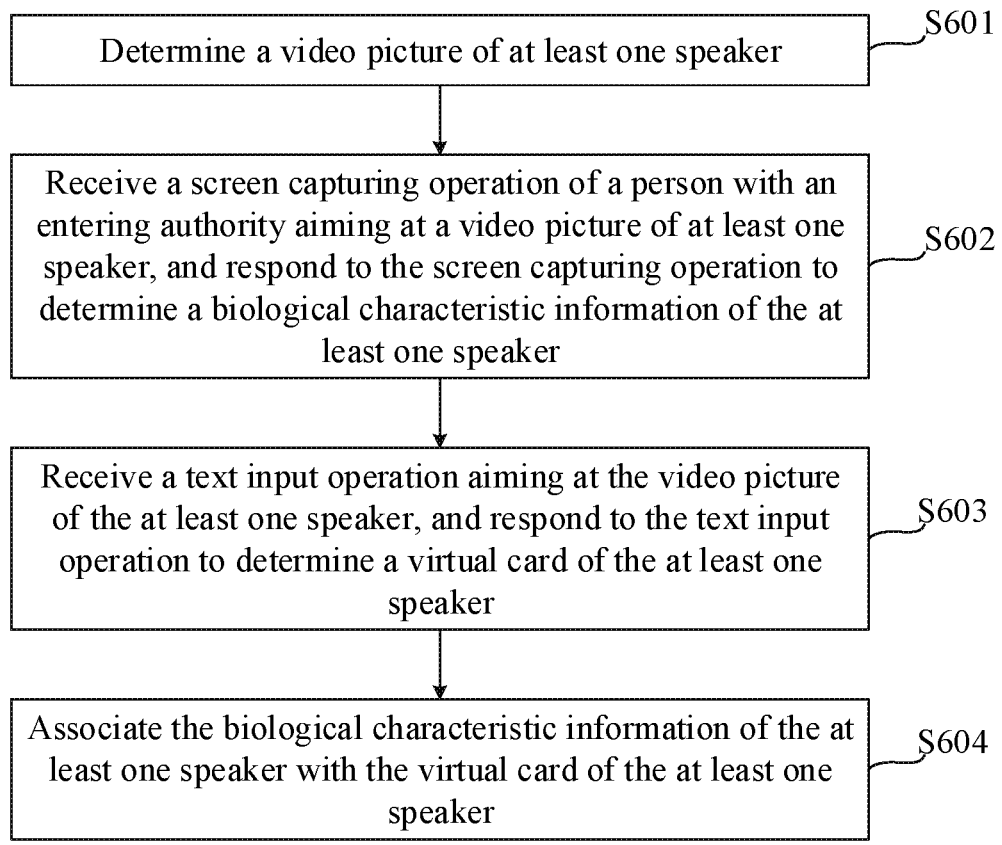
FIG. 8 is a method flowchart of a method for sending a virtual card according to an embodiment of the present disclosure if no biological characteristic information of at least one speaker is obtained in target audio-video stream data.

In some embodiments of the present disclosure, as shown in FIG. 8, if the biological characteristic information of the at least one speaker is not obtained from the target audio-video stream data, the method further includes:

S601: a respective video picture of the at least one speaker is determined;

S602: a screen capturing operation of a person with an entering authority aiming at the respective video picture of the at least one speaker is received, and the screen capturing operation is responded to determine the respective biological characteristic information of the at least one speaker;

S603: a text input operation aiming at the respective video picture of the at least one speaker is received, and the text input operation is responded to determine the respective virtual card of the at least one speaker; and S604: the respective biological characteristic information of the at least one speaker is associated with the respective virtual card of the at least one speaker.

In some embodiments, the specific implementation process of the steps S601 to S604 is as follows.

If the biological characteristic information of the at least one speaker is not obtained from the target audio-video stream data, for example, the at least one speaker is a person who temporarily joins in the remote video conference system, and a face picture and a virtual card of the speaker are not entered into the system in advance, a respective video picture of the at least one speaker is determined at first, for example, if the biological characteristic information of the at least one speaker is not identified in the plurality of audio-video stream data, the respective video picture of the at least one speaker may be determined by labeling an "unknown person" in the respective video picture of the at least one speaker. Then the screen capturing operation of the person with the entering authority aiming at the respective video picture of the at least one speaker is received, and the screen capturing operation is responded to determine the respective virtual card of the at least one speaker, wherein the person with the entering authority may be a conference host or a conference organizer, which is not limited herein, and the screen capturing operation may be operation of the person with the entering authority for circling the face region of the at least one speaker in the video picture, for example, using a circle to surround the face region of the at least one speaker, and for another example, using a mouse to click on the video picture corresponding to the at least one speaker. Of course, those skilled in the art may also set the specific form of the screen capturing operation according to actual application requirements, which is not limited herein.

After the person with the entering authority performs the screen capturing operation on the respective video picture of the at least one speaker, the text input operation aiming at the respective video picture of the at least one speaker is received, and the text input operation is responded to determine the respective virtual card of the at least one speaker, it may be that after the person with the entering authority performs the screen capturing operation on the respective video picture of the at least one speaker, a text input box for entering the respective virtual card of the at least one speaker is popped out, and the person with entering authority may input the respective virtual card of the at least one speaker in the text input box, for example, inputting the respective name, position, department and contact method of the at least one speaker. Then, the respective biological characteristic information of the at least one speaker is associated with the respective virtual card of the at least one speaker. Therefore, the biological characteristic information and the virtual card of the speaker who temporarily joins in the video conference may be entered in real time, so that sharing of the virtual card of any participant can be ensured, and the sharing efficiency of the virtual card is further improved.

In some embodiments of the present disclosure, if no speaker is detected from the at least one audio-video stream data, the method further includes:

a conference terminal corresponding to the conference host is determined from the plurality of participant terminals, and audio-video stream data corresponding to the conference terminal are taken as the target audio-video stream data.

In some embodiments, if no speaker is detected from the at least one audio-video stream data, that is to say, the participants corresponding to all the current participant terminals do not speak, that is, no speaker exists, the conference terminal corresponding to the conference host may be determined from the plurality of participant terminals, and the audio-video stream data corresponding to the conference terminal are taken as the target audio-video stream data, so that the virtual card of the conference host can be displayed on the terminal corresponding to the conference host if no speaker exists currently, all the participants may know the virtual card of the conference host, and the sharing efficiency of the virtual card is guaranteed. Of course, it is also possible to set the default display of the virtual card when there is no speaker according to actual application requirements, which is not described in detail herein.

Figure 9:
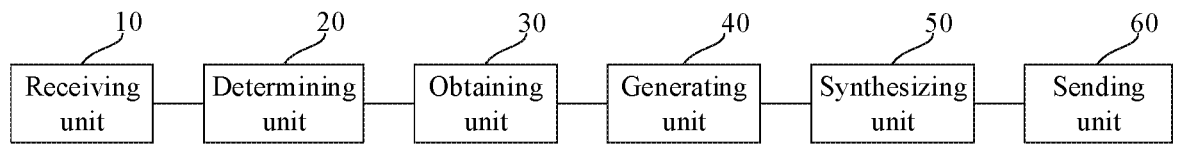
FIG. 9 is a structural diagram of a device for sending a virtual card according to an embodiment of the present disclosure.

Based on the same disclosure concept, as shown in FIG. 9, the embodiment of the present disclosure also provides a device for sending a virtual card, applied to a server side, and including:

a receiving unit 10, configured to receive at least one audio-video stream data of a plurality of participant terminals in communication connection with the server side;

a determining unit 20, configured to determine a target audio-video stream data corresponding to at least one speaker from the at least one audio-video stream data;

an obtaining unit 30, configured to obtain respective biological characteristic information configured to identify the at least one speaker from the target audio-video stream data, wherein the biological characteristic information includes at least one of face characteristic information and voiceprint characteristic information;

a generating unit 40, configured to generate a respective virtual card of the at least one speaker according to the respective biological characteristic information of the at least one speaker;

a synthesizing unit 50, configured to overlay the respective virtual card of the at least one speaker to the target audio-video stream data, and synthesize the target audio-video stream data with other audio-video stream data except the target audio-video stream data in the plurality of audio-video stream data into a to-be-sent audio-video stream data; and a sending unit 60, configured to send the to-be-sent audio-video stream data to the plurality of participant terminals so as to enable the plurality of participant terminals to display the respective virtual card of the at least one speaker.

In some embodiments of the present disclosure, if the obtaining unit 30 acquires a plurality of pieces of different voiceprint characteristic information simultaneously from the target audio-video stream data, the determining unit 20 is further configured to:

determine the at least one speaker as a plurality of speakers corresponding to the plurality of pieces of different voiceprint characteristic information.

In some embodiments of the present disclosure, if the obtaining unit 30 acquires a plurality of pieces of different voiceprint characteristic information sequentially from the target audio-video stream data, the determining unit 20 is further configured to:

determine the at least one speaker as a plurality of speakers corresponding to the plurality of pieces of different characteristic information.

In some embodiments of the present disclosure, the synthesizing unit 50 is configured to:

for each of the at least one speaker, detect a coordinate position of a face region of the corresponding speaker from the target audio-video stream data;

determine a target position and a size of the virtual card of the speaker according to the coordinate position of the face region of the speaker; and overlay the virtual card to the target audio-video stream data according to the target position and the size of the virtual card.

In some embodiments of the present disclosure, if no face region of each speaker is detected in the target audio-video stream data, the synthesizing unit 50 is further configured to:

overlay the virtual card of the at least one speaker to the target audio-video stream data according to a preset coordinate position.

In some embodiments of the present disclosure, the synthesizing unit 50 is configured to:

calculate a corresponding average gray scale value of at least one image in the target audio-video stream data in each color channel of a preset color channel, adjust chromaticity of the respective virtual card of the at least one speaker according to a proportion of the average gray scale value corresponding to each color channel, and obtain the respective adjusted virtual card of the at least one speaker so as to enable a contrast between the chromaticity of the respective adjusted virtual card of the at least one speaker and chromaticity of the at least one image to be greater than a preset value; and overlay the respective adjusted virtual card of the at least one speaker to the target audio-video stream data.

In some embodiments of the present disclosure, the synthesizing unit 50 is configured to:

determine coordinate positions of other regions except the face region of each speaker in the target audio-video stream data according to the coordinate position of the face region of the speaker;

determine at least one communication region from the other regions according to the coordinate positions of the other regions;

determine a target communication region greater than a preset area from the at least one communication region, and a coordinate position of the target communication region; and determine the target position and the size of the virtual card of each speaker according to the target communication region and the coordinate position of the target communication region.

In some embodiments of the present disclosure, the synthesizing unit 50 is configured to:

according to a shape of a preset business card, determine a maximum-area region the same as the shape of the preset business card in the target communication region, and adjust the target position and the size of the virtual card of each speaker according to a coordinate position of the maximum-area region.

In some embodiments of the present disclosure, the synthesizing unit 50 is configured to:

determine an inscribed graph of the maximum area in the target communication region;

take the inscribed graph of the maximum area as a shape of the virtual card of each speaker; and adjust the target position and the size of the virtual card of each speaker according to a coordinate position of the inscribed graph of the maximum area.

In some embodiments of the present disclosure, the synthesizing unit 50 is configured to:

according to a preset layout, synthesize the target audio-video stream data overlaid with the respective virtual card of the at least one speaker with other audio-video stream data except the target audio-video stream data in the plurality of audio-video stream data into the to-be-sent audio-video stream data, so that video pictures corresponding to the target audio-video stream data overlaid with the respective virtual card of the at least one speaker in the plurality of participant terminals are greater than video pictures corresponding to the other audio-video stream data.

In some embodiments of the present disclosure, the device further includes a storage unit, configured to:

store corresponding relations between biological characteristic information and virtual cards of known participants in advance.

In some embodiments of the present disclosure, if the biological characteristic information of the at least one speaker is not obtained from the target audio-video stream data, the device further includes an entering unit, configured to:

determine a respective video picture of the at least one speaker;

receive a screen capturing operation of a person with an entering authority aiming at the respective video picture of the at least one speaker, and respond to the screen capturing operation to determine the respective biological characteristic information of the at least one speaker;

receive a text input operation aiming at the respective video picture of the at least one speaker, and respond to the text input operation to determine the respective virtual card of the at least one speaker; and associate the respective biological characteristic information of the at least one speaker with the respective virtual card of the at least one speaker.

In some embodiments of the present disclosure, if no speaker is detected from the plurality of audio-video stream data, the device further includes a setting unit, configured to:

determine a participant terminal corresponding to a conference host from the plurality of participant terminals, and take audio-video stream data corresponding to the participant terminal as the target audio-video stream data.

Figure 10:
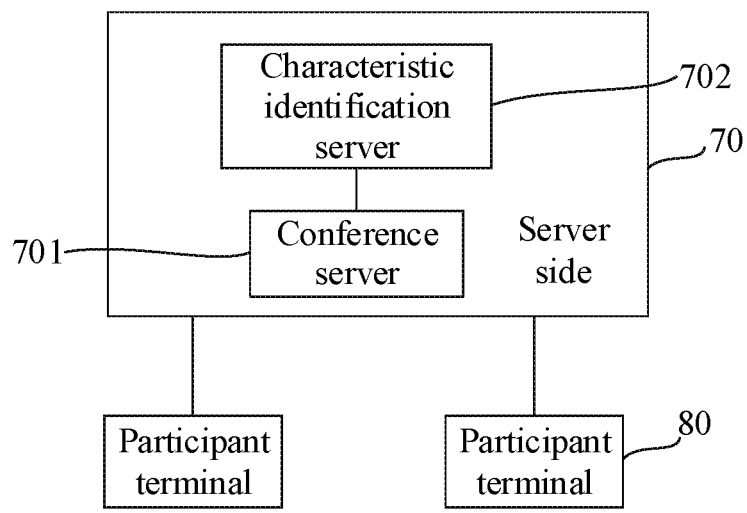
FIG. 10 is a structural diagram of a system for sending a virtual card according to an embodiment of the present disclosure.

Based on the same disclosure concept, as shown in FIG. 10, some embodiments of the present disclosure also provide a system for sending a virtual card, wherein the sending system includes a server side 70 and a plurality of participant terminals 80 in communication connection with the server side 80;

the server side 70 is configured to receive at least one audio-video stream data of the plurality of participant terminals in communication connection with the server side;

the server side 70 is further configured to determine a target audio-video stream data corresponding to at least one speaker from the at least one audio-video stream data;

the server side 70 is further configured to obtain respective biological characteristic information configured to identify the at least one speaker from the target audio-video stream data, wherein the biological characteristic information includes at least one of face characteristic information and voiceprint characteristic information;

the server side 70 is further configured to generate a respective virtual card of the at least one speaker according to the respective biological characteristic information of the at least one speaker, superpose the respective virtual card of the at least one speaker to the target audio-video stream data, synthesize the target audio-video stream data with other audio-video stream data except the target audio-video stream data in the plurality of audio-video stream data into a to-be-sent audio-video stream data, and send the to-be-sent audio-video stream data to the plurality of participant terminals 80; and the plurality of participant terminals 80 are configured to display the respective virtual card of the at least one speaker.

In some embodiments of the present disclosure, the server side 70 includes a conference server 701 and a characteristic identification server 702 in communication connection with the conference server 701, wherein the conference server 701 is configured to receive the plurality of audio-video stream data, determine the target audio-video stream data from the plurality of audio-video stream data, determine the virtual card corresponding to the respective biological characteristic information of the at least one speaker by calling a characteristic detection and identification interface of the characteristic identification server, and send the to-be-sent audio-video stream data overlaid with the virtual card to the plurality of participant terminals 80; and the characteristic identification server 702 is configured to identify the respective biological characteristic information configured to identify the at least one speaker from the target audio-video stream data and send the respective biological characteristic information of the at least one speaker to the conference server 701.

In some embodiments of the present disclosure, the plurality of participant terminals 80 are further configured to:

display video pictures corresponding to the target audio-video stream data overlaid with the virtual card in a mode of being greater than video pictures corresponding to the other audio-video stream data except the target audio-video stream data in the plurality of audio-video stream data.

Figure 11:
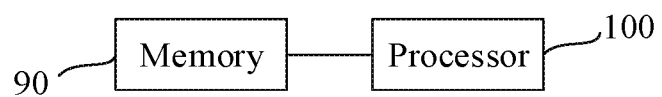
FIG. 11 is a structural diagram of a device for sending a virtual card according to an embodiment of the present disclosure.

Based on the same disclosure concept, as shown in FIG. 11, some embodiments of the present disclosure also provide a device for sending a virtual card, including:

a memory 90 and a processor 100, wherein the memory 90 is configured to store computer programs; and the processor 100 is configured to perform the computer programs in the memory so as to implement the following steps:

at least one audio-video stream data of a plurality of participant terminals in communication connection with a server side is received;

a target audio-video stream data corresponding to at least one speaker is determined from the at least one audio-video stream data;

respective biological characteristic information configured to identify the at least one speaker is obtained from the target audio-video stream data, wherein the biological characteristic information includes at least one of face characteristic information and voiceprint characteristic information;

a respective virtual card of the at least one speaker is generated according to the respective biological characteristic information of the at least one speaker;

the respective virtual card of the at least one speaker is overlaid to the target audio-video stream data, and the target audio-video stream data are synthesized with other audio-video stream data except the target audio-video stream data in the plurality of audio-video stream data into a to-be-sent audio-video stream data; and the to-be-sent audio-video stream data are sent to the plurality of participant terminals so as to enable the plurality of participant terminals to display the respective virtual card of the at least one speaker.

Based on the same disclosure concept, some embodiments of the present disclosure also provide a computer non-transient readable storage medium, wherein the storage medium stores a computer instruction, and when the computer instruction is executed on a computer, the computer executes the above method for sending the virtual card.

Those skilled in the art will appreciate that embodiments of the present application may be provided as a method, a system, or a computer program product. Thus, the present application may take the form of an entirely hardware embodiment, an entirely software embodiment, or an embodiment combining software and hardware aspects. Moreover, the present application may take the form of a computer program product embodied on one or more computer-usable storage media (including, but not limited to, a magnetic disk storage, CD-ROM, an optical storage, and the like) having computer-usable program codes embodied therein.

The present application is described with reference to flowcharts and/or block diagrams of methods, devices (systems), and computer program products according to the present application. It is to be understood that each flow and/or block of the flowcharts and/or block diagrams, and combinations of flows and/or blocks in the flowcharts and/or block diagrams, may be implemented by computer program instructions. These computer program instructions may be provided to a processor of a general purpose computer, a special purpose computer, an embedded processor, or other programmable data processing devices to produce a machine, such that the instructions, which execute via the processor of the computer or other programmable data processing device, produce a device for implementing the functions specified in one flow or multiple flows of the flowcharts and/or one block or multiple blocks of the block diagrams.

These computer program instructions may also be stored in a computer-readable memory that can direct a computer or other programmable data processing devices to function in a particular manner, such that the instructions stored in the computer-readable memory produce an article of manufacture including an instruction device which implements the function specified in the one flow or multiple flows of the flowcharts and/or one block or multiple blocks of the block diagrams.

These computer program instructions may also be loaded onto a computer or other programmable data processing devices to cause a series of operational steps to be performed on the computer or other programmable devices to produce a computer implemented process such that the instructions which execute on the computer or other programmable device provide steps for implementing the functions specified in the one flow or multiple flows of the flowcharts and/or one block or multiple blocks of the block diagrams.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all alterations and modifications that fall within the scope of this disclosure.

It will be apparent to those skilled in the art that various modifications and variations can be made in the present application without departing from the spirit or scope of the application. Thus, it is intended that the present application covers the modifications and variations of this application provided they come within the scope of the appended claims and their equivalents.

What is claimed is:

1. A method for sending a virtual card, applied to a server side, and comprising:
   receiving at least one piece of audio-video stream data of a plurality of participant terminals in communication connection with the server side;
   determining a target audio-video stream data corresponding to at least one speaker from the at least one piece of audio-video stream data;
   obtaining a biological characteristic information configured to identify the at least one speaker from the target audio-video stream data, wherein the biological characteristic information comprises at least one of a face characteristic information or a voiceprint characteristic information;
   in response to a plurality of pieces of different voiceprint characteristic information being simultaneously obtained from the target audio-video stream data, determining the at least one speaker as a plurality of speakers corresponding to the plurality of pieces of different voiceprint characteristic information;
   generating a virtual card of the at least one speaker according to the biological characteristic information;
   overlaying the virtual card to the target audio-video stream data, and synthesizing the target audio-video stream data with other audio-video stream data in response to the at least piece of audio-video stream data comprising a plurality of audio-video stream data into a to-be-sent audio-video stream data; and
   sending the to-be-sent audio-video stream data to the plurality of participant terminals so as to enable the plurality of participant terminals to display the virtual card of the at least one speaker.

2. The method according to claim 1, wherein in response to a plurality of pieces of different voiceprint characteristic information being sequentially obtained from the target audio-video stream data within a preset duration, the method further comprises:
   determining the at least one speaker as a plurality of speakers corresponding to the plurality of pieces of different characteristic information.

3. The method according to claim 1, wherein the overlaying the virtual card to the target audio-video stream data, comprises:
   detecting a coordinate position of a face region of the at least one speaker from the target audio-video stream data;
   determining a target position and a size of the virtual card according to the coordinate position; and
   overlaying the virtual card to the target audio-video stream data according to the target position and the size.

4. The method according to claim 3, wherein in response to the face region being not detected in the target audio-video stream data, the method further comprises:
   overlaying the virtual card to the target audio-video stream data according to a preset coordinate position.

5. The method according to claim 1, wherein the overlaying the virtual card to the target audio-video stream data, comprises:
   calculating average gray scale values of at least one image in the target audio-video stream data, wherein the average gray scale values correspond to each color channel of preset color channels respectively, adjusting chromaticity of the virtual card according to a proportion of the average gray scale values, and obtaining adjusted virtual card of the at least one speaker so as to enable a contrast between the chromaticity of the adjusted virtual card and a chromaticity of the at least one image to be greater than a preset value; and
   overlaying an adjusted virtual card of the at least one speaker to the target audio-video stream data.

6. The method according to claim 3, wherein the determining the target position and the size of the virtual card according to the coordinate position, comprises:
   determining coordinate positions of other regions except the face region in the target audio-video stream data according to the coordinate position of the face region;
   determining at least one communication region from the other regions according to the coordinate positions of the other regions;
   determining a target communication region from the at least one communication region, and a coordinate position of the target communication region, wherein an area of the target communication region is greater than a preset area; and
   determining the target position and the size of the virtual card according to the target communication region and the coordinate position of the target communication region.

7. The method according to claim 6, wherein the determining the target position and the size of the virtual card according to the target communication region and the coordinate position of the target communication region, comprises:
   according to a shape of a preset card, determining a region of a maximum area and a shape same as the shape of the preset card in the target communication region, and adjusting the target position and the size of the virtual card according to a coordinate position of the region.

8. The method according to claim 6, wherein the determining the target position and the size of the virtual card according to the target communication region and the coordinate position of the target communication region, comprises:
   determining an inscribed graph of a maximum area in the target communication region;
   taking a shape of the inscribed graph as a shape of the virtual card; and
   adjusting the target position and the size of the virtual card according to a coordinate position of the inscribed graph.

9. The method according to claim 1, wherein the overlaying the virtual card to the target audio-video stream data, and synthesizing the target audio-video stream data with other audio-video stream data except the target audio-video stream data in the plurality of audio-video stream data into the to-be-sent audio-video stream data, comprise:
   according to a preset layout, synthesizing the target audio-video stream data overlaid with the virtual card with the other audio-video stream data except the target audio-video stream data in the plurality of audio-video stream data into the to-be-sent audio-video stream data, so that video pictures corresponding to the target audio-video stream data with the virtual card of the at least one speaker in the plurality of participant terminals are greater than video pictures corresponding to the other audio-video stream data.

10. The method according to claim 1, wherein before receiving the plurality of audio-video stream data of the plurality of participant terminals in communication connection, the method further comprises:
storing corresponding relations between biological characteristic information and virtual cards of known participants in advance.

11. The method according to claim 1, wherein in response to the biological characteristic information of the at least one speaker is not obtained from the target audio-video stream data, the method further comprises:
determining a video picture of the at least one speaker;
receiving a screen capturing operation of a person with an entering authority aiming at the video picture, and responding to the screen capturing operation to determine the biological characteristic information of the at least one speaker;
receiving a text input operation aiming at the video picture of the at least one speaker, and responding to the text input operation to determine the virtual card of the at least one speaker; and
associating the biological characteristic information of the at least one speaker with the virtual card of the at least one speaker.

12. A system for sending a virtual card, comprising a server side and a plurality of participant terminals in communication connection with the server side;
the server side is configured to receive at least one piece of audio-video stream data of the plurality of participant terminals in communication connection with the server side;
the server side is further configured to determine a target audio-video stream data corresponding to at least one speaker from the at least one piece of audio-video stream data;
the server side is further configured to obtain a biological characteristic information configured to identify the at least one speaker from the target audio-video stream data, wherein the biological characteristic information comprises at least one of a face characteristic information or a voiceprint characteristic information;
in response to a plurality of pieces of different voiceprint characteristic information being simultaneously obtained from the target audio-video stream data, the server side is further configured to determine the at least one speaker as a plurality of speakers corresponding to the plurality of pieces of different voiceprint characteristic information;
the server side is further configured to generate a virtual card of the at least one speaker according to the biological characteristic information of the at least one speaker, overlay the virtual card to the target audio-video stream data, synthesize the target audio-video stream data with other audio-video stream data in response to the at least one piece of audio-video stream data comprising a plurality of audio-video stream data into a to-be-sent audio-video stream data, and send the to-be-sent audio-video stream data to the plurality of participant terminals; and
the plurality of participant terminals are configured to display the virtual card.

13. The system according to claim 12, wherein the server side comprises a conference server and a characteristic identification server in communication connection with the conference server, the conference server is configured to receive the at least one piece of audio-video stream data, determine the target audio-video stream data from the at least one piece of audio-video stream data, determine the virtual card corresponding to the biological characteristic information of the at least one speaker by calling a characteristic detection and identification interface of the characteristic identification server, and send the to-be-sent audio-video stream data overlaid with the virtual card to the plurality of participant terminals; and
the characteristic identification server is configured to identify the biological characteristic information configured to identify the at least one speaker from the target audio-video stream data and send the biological characteristic information of the at least one speaker to the conference server.

14. The system according to claim 13, wherein the plurality of participant terminals are further configured to:
display a video picture corresponding to the target audio-video stream data overlaid with the virtual card in a mode of an area of the video picture being greater than an area of video pictures corresponding to the other audio-video stream data in response to the at least one piece of audio-video stream data comprising the plurality of audio-video stream data.

15. A device for sending a virtual card, comprising:
a memory and a processor, wherein
the memory is configured to store computer programs; and
the processor is configured to execute the computer programs in the memory so as to implement followings:
receiving at least one piece of audio-video stream data of a plurality of participant terminals in communication connection with a server side;
determining a target audio-video stream data corresponding to at least one speaker from the at least one of audio-video stream data;
obtaining a biological characteristic information configured to identify the at least one speaker from the target audio-video stream data, wherein the biological characteristic information comprises at least one of a face characteristic information or a voiceprint characteristic information;
in response to a plurality of pieces of different voiceprint characteristic information being simultaneously obtained from the target audio-video stream data, determining the at least one speaker as a plurality of speakers corresponding to the plurality of pieces of different voiceprint characteristic information;
generating a virtual card of the at least one speaker according to the biological characteristic information of the at least one speaker;
overlaying the virtual card to the target audio-video stream data, and synthesizing the target audio-video stream data with other audio-video stream data in response to the at least one piece of audio-video stream data comprising a plurality of audio-video stream data into a to-be-sent audio-video stream data; and
sending the to-be-sent audio-video stream data to the plurality of participant terminals so as to enable the plurality of participant terminals to display the virtual card.

16. A computer non-transient readable storage medium, wherein
the computer non-transient readable storage medium stores a computer instruction, and when the computer instruction is executed on a computer, the computer executes the method for sending the virtual card described according to claim 1.

17. The device according to claim 15, wherein in response to the a plurality of pieces of different voiceprint characteristic information being obtained sequentially from the target audio-video stream data, the processor is configured to execute the computer programs in the memory to:
determine the at least one speaker as a plurality of speakers corresponding to the plurality of pieces of different characteristic information.

18. The device according to claim 15, wherein the processor is further configured to execute the computer programs in the memory:
detect a coordinate position of a face region of the at least one speaker from the target audio-video stream data;
determine a target position and a size of the virtual card according to the coordinate position of the face region; and
overlay the virtual card to the target audio-video stream data according to the target position and the size of the virtual card.

\* \* \* \* \*